No. 714,021. Patented Nov. 18, 1902.
L. G. NILSON.
CONTROLLER FOR ELECTRIC MOTORS.
(Application filed May 15, 1902.)
(No Model.)
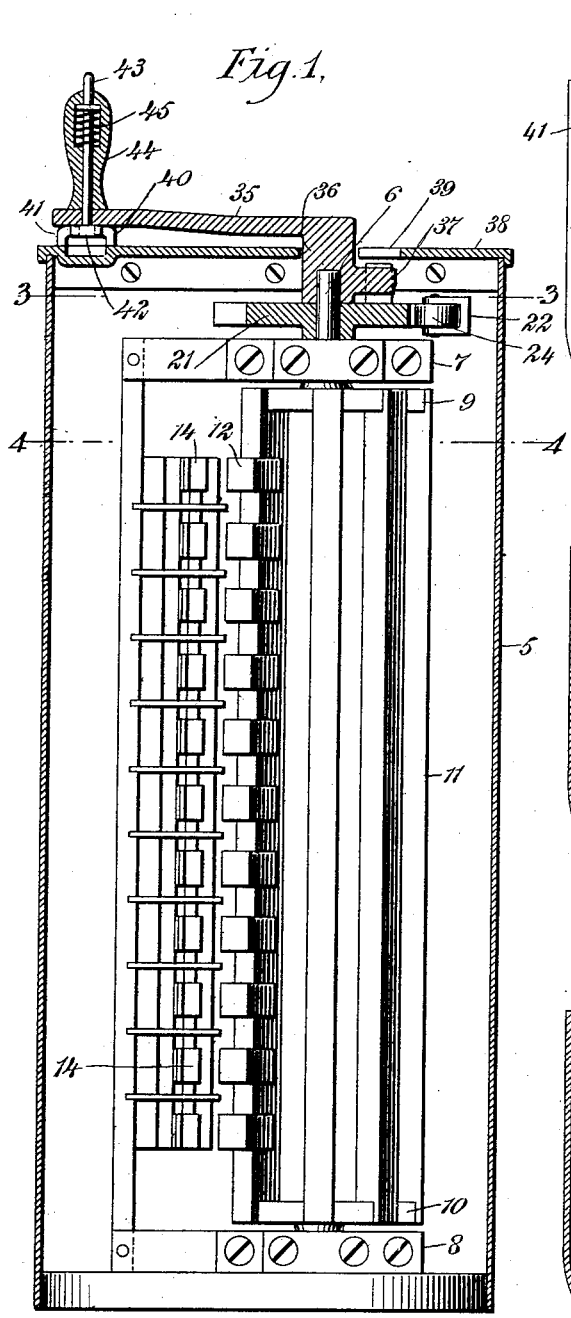
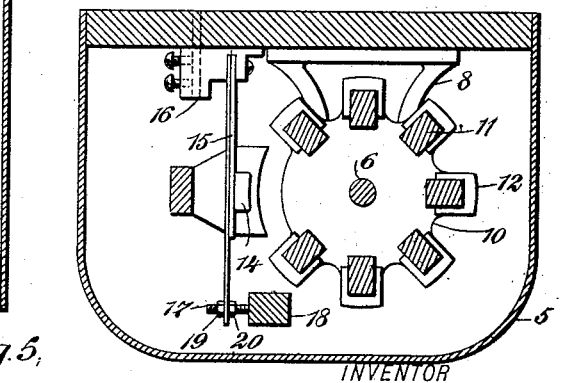
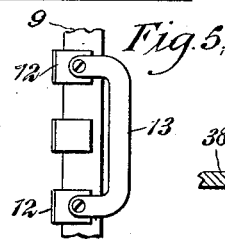
WITNESSES:
Edward Thorpe
C. R. Ferguson
INVENTOR
Lars G. Nilson
BY
ATTORNEYS.
THE NORRIS PETERS CO., PHOTO-LITHO., WASHINGTON, D. C.

UNITED STATES PATENT OFFICE.

LARS G. NILSON, OF NEW YORK, N. Y., ASSIGNOR TO SIEGFRIED M. FISCHER AND HARRY S. FISCHER, OF NEW YORK, N. Y., AND HULDAH ANDERSON, OF DES MOINES, IOWA.

CONTROLLER FOR ELECTRIC MOTORS.

SPECIFICATION forming part of Letters Patent No. 714,021, dated November 18, 1902.

Application filed May 15, 1902. Serial No. 107,390. (No model.)

*To all whom it may concern:*

Be it known that I, LARS G. NILSON, a citizen of the United States, and a resident of the city of New York, borough of Manhattan, in the county and State of New York, have invented a new and Improved Controller for Electric Motors, of which the following is a full, clear, and exact description.

This invention relates to improvements in controllers for electric motors, particularly of the class used for electric vehicles, the object being to improve and simplify the mechanical construction and general arrangement, so as to cheapen the first cost, reduce wear to a minimum, have all parts of easy access, and render the operation of the whole convenient and reliable.

A further object is to provide the contact springs or fingers with a suitable adjustment and to improve the controller-lever construction and its operating connections with the controller-drum.

I will describe a controller for electric motors embodying my invention and then point out the novel features in the appended claims.

Reference is to be had to the accompanying drawings, forming a part of this specification, in which similar characters of reference indicate corresponding parts in all the figures.

Figure 1 is an elevation, partly in section, of an electric controller embodying my invention. Fig. 2 is a top plan view. Fig. 3 is a section on the line 3 3 of Fig. 1. Fig. 4 is a section on the line 4 4 of Fig. 1. Fig. 5 is a detail showing a means for connecting contact-points, and Fig. 6 is a section on the line 6 6 of Fig. 2.

Referring to the drawings, 5 designates the casing for the controller and within which is arranged the drum for carrying the contact fingers or blocks. This drum consists of a shaft 6, having bearings in brackets 7 8 attached to the rear wall of the casing and secured to the upper and lower ends of the shaft 6. Between the brackets are disks 9 10, to which contact-supporting strips 11, of insulating material, are secured. As here shown, these strips are seated in notches formed in the disks. The controller can be made up for any number of speeds and any number of circuits; but in this particular instance I have shown the switch-drum as arranged for seven strips 11, intended for seven speeds—five forward and two reverse. On each strip 11 a series of contact-blocks 12 is arranged, the several contact-blocks of course being spaced apart. I have indicated eleven of these contact-blocks. Two blocks are used as terminals for supplying the current to the controller and eight for motor connections and one extra terminal for introducing a resistance. By making connections by means of straps 13, as indicated in Fig. 5, any series or parallel combinations can be made between the contact-blocks.

For coacting with the contact-blocks carried by the drum I provide an equal number of contact-fingers 14, each finger 14 being mounted on a spring-yielding metal conducting-strip 15, extended from a terminal block 16, and at the opposite end the yielding strip is engaged by a screw-rod 17, extended from a post 18, and nuts 19 20 engage against opposite sides of the strip, so that the strip may be moved inward or outward to regulate the contacts 14 with relation to the contacts 12. This yielding plate preferably consists, as shown, of two strips, one of high electrical conductivity for carrying in the current and the other to serve as the spring.

Secured to the shaft 6, above the bracket 7, is a toothed wheel 21, which has as many notches as there are speeds in the controller, plus one extra notch for the off point. A holding device for this wheel 21 consists of an arm 22, pivoted to a lug 23, attached to the back board of the casing and carrying at its free end a roller 24 for engaging with the said wheel 21, and the roller is held yieldingly in such engagement by means of a spring 25. It will be noted that the side edges of the teeth of the wheel 21 are curved, so that the spring, acting upon the arm 22, will operate with sufficient force to rotate the wheel until the roller 24 reaches the bottom of a notch between teeth, which position corresponds to some point on or off the controller.

Operating in lugs 26 27 on the upper side of the wheel is a cushion-pin 28, which is moved forward by means of a spring 29, arranged between the lugs 27, and a pin 30, passed through the cushion-pin 28. At the opposite side on the upper surface of the wheel 21 is another cushion-pin 31, operating in lugs 32 33 and moved forward by means of a spring 34.

The controller-lever 35 has a hub portion 36, which engages over the end of the shaft 6, and on this hub portion is a projection 37, designed to engage between the inner ends of the cushion-pins 28 and 31. In Fig. 2 it will be noted that the top plate 38 of the casing has an offset opening 39, which permits the portion 37, carried by the lever 35, to pass to the under side of the top of the casing, while the hub portion 36 passes through an opening to engage with the shaft. The position of this opening 39 is such, however, that the lever can only be placed in position or removed when the switch-drum is on an off point. When the lever is turned, the projection 37 will press against one or the other of the cushion-pins, compressing its spring; but as the spring 25 holds the roller 24 against the wheel 21 with considerable force the switch-drum will not turn until the said projection 37 reaches the inner lug engaged by the cushion-pin upon which the said projection is bearing. Then the drum will be moved with the controller-lever, forcing the roller 24 out until it has reached a point between notches of the wheel 21. Then the spring of the cushion-pin will cause the drum to move sufficiently to permit the roller 24 to fall into the space between teeth of the wheel 21. Therefore it is impossible to leave the drum in any position except on some proper point on or entirely off.

In order to prevent accidental reversal of the motor, the top plate 38 of the casing is provided with lugs 40 41, against which the lower enlarged portion 42 on a rod 43, passing through a longitudinal bore in the lever-handle 44, engages. The lugs 40 and 41 are beveled on their under sides, as clearly indicated in Fig. 6, in such manner as to permit the lower enlarged portion 42 of the rod 43 when the rod is pressed down to pass underneath the lugs, so that the lever can be moved into one of the reversed positions. The enlarged portion 42 is normally held upward, however, to engage with the lugs by means of a spring 45, arranged in the handle of the lever; but when bringing the lever from the first reversed point to the off position it is not necessary to press the rod 43 downward, as the enlarged portion 42 is beveled on its upper side, as clearly indicated in dotted lines in Fig. 6, the bevel being in an opposite direction to the bevel of the lugs 40 and 41. This permits the enlarged portion to pass downward below the lugs, so that the lever can be moved in the opposite direction.

It will be understood that when in off position the lever is normally on the forward side of the lugs.

Having thus described my invention, I claim as new and desire to secure by Letters Patent—

1. In a controller for electric motors, a contact-carrying drum, a series of contact-fingers, yielding devices supporting the fingers, each of said devices consisting of a strip of metal of high conductivity, and a spring-plate, the said supporting devices being connected at one end with a terminal, and adjusting means at the other end, substantially as specified.

2. In an electric controller, a casing, a shaft arranged in the casing, a series of strips of insulating material carried by said shaft, a series of contact-blocks carried by each strip, contact-fingers having connection with motor-terminals, spring-yielding plates on which said last-named contact-fingers are mounted, and means for adjusting said plates, substantially as specified.

3. In a controller for electric motors, a casing, a contact-drum arranged in the casing, fixed contacts in the casing, a toothed wheel on the upper end of the shaft of said drum, an arm mounted to swing in the casing, a roller carried by said arm for engaging with the wheel, a spring for holding the roller in yielding engagement with the wheel, a controller-lever engaging with the shaft, a projection on said lever, and cushioned pins mounted on the wheel at opposite sides of said projection, substantially as specified.

4. A controller for electric motors comprising a casing, a contact-carrying drum mounted to rotate in the casing, a toothed wheel attached to the upper end of the shaft of said drum, an arm mounted to swing in the casing, a roller carried by said arm, a spring for holding the roller in yielding engagement with the toothed wheel, an operating-lever adapted for engagement with the shaft, a projection on the hub of said lever, lugs mounted on the toothed wheel, and spring-pressed pins operating in said lugs at opposite sides of the said projection, substantially as specified.

5. A controller for electric motors comprising a casing, a contact-carrying drum mounted to rotate in the casing, an operating-lever therefor, lugs extended upward from the top of the casing and spaced apart, the said lugs being beveled on their under sides, a rod movable in the handle of the lever, and an enlarged portion on the lower end of said rod adapted for engagement with said lugs, the said enlarged portion being inclined or beveled on its under side, substantially as specified.

In testimony whereof I have signed my name to this specification in the presence of two subscribing witnesses.

LARS G. NILSON.

Witnesses:
JNO. M. RITTER,
C. R. FERGUSON.